Figure 1:
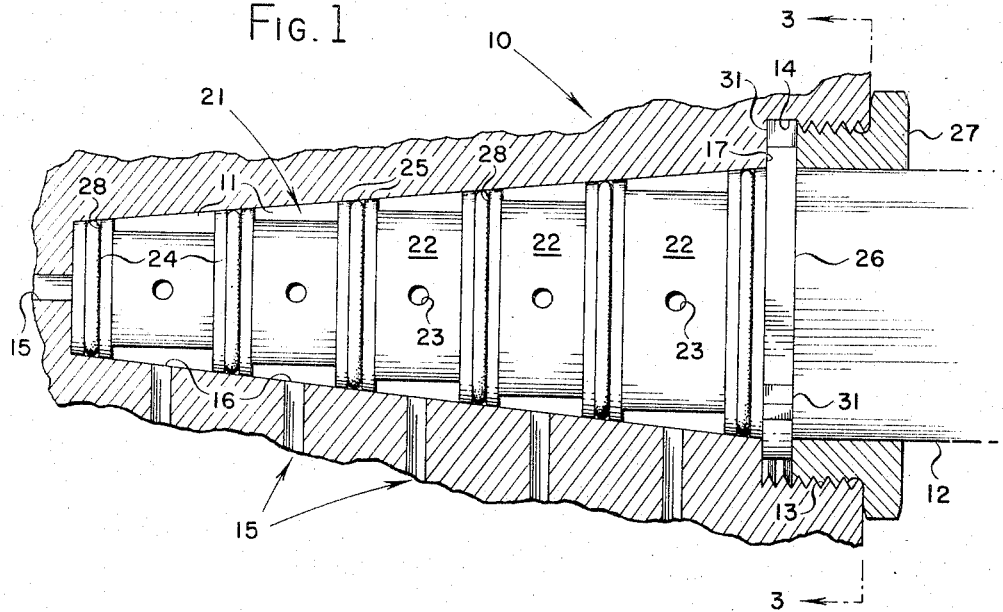

Oct. 17, 1967   F. D. LEWIS, SR., ET AL   3,347,260
CARTRIDGE VALVE ASSEMBLY
Filed Sept. 22, 1964

INVENTORS.
FRANK D. LEWIS, SR.
EDWIN W. RUMRILL, JR.
BY
George C. Sullivan
Agent

United States Patent Office 3,347,260
Patented Oct. 17, 1967

3,347,260
CARTRIDGE VALVE ASSEMBLY
Frank D. Lewis, Sr., and Edwin W. Rumrill, Jr., Atlanta, Ga., assignors to Lockheed Aircraft Corporation, Burbank, Calif.
Filed Sept. 22, 1964, Ser. No. 398,374
5 Claims. (Cl. 137—315)

This invention relates in general to fluid valves and in particular to fluid valves of the cartridge type.

Valves of the cartridge type are commonly used as control elements in fluid pressure systems. Such cartridge valves typically consist of a spool assembly reciprocally and/or rotationally contained within a cylindrical bore, the bore having a number of ports to permit fluid passage therethrough. The position of the spool within the bore causes selected ports to be placed in communication with one another. Reciprocal movement of the spool frequently is obtained by applying a fluid pressure to the spool for this purpose, although movement of the spool may also be accomplished by a direct mechanical connection thereto.

Because of the relatively close tolerances which must exist between the spool and cylinder of such a valve, it is customary to produce these valves as an assembly including the spool and a valve housing containing the cylindrical bore in which the spool is received. The valve housing will have fluid openings corresponding to the fluid ports in the cylindrical bore contained within, and the valve assembly thus formed can conveniently be mounted in a suitable bore in a valve body or manifold.

Problems have arisen with respect to the sealing of these cartridge valve assemblies when they are inserted into a valve body. Pressure has to be supplied to the various ports on the exterior of the valve assembly by means of fluid passageways contained in the valve body. To isolate the region surrounding each fluid port, a number of annular sealing means such as O-rings are provided on the exterior of the valve assembly. Matching sealing surfaces or lands are provided within the valve body bore to receive these O-rings when the valve assembly is fully inserted within the valve body bore.

Since the usual valve body contains a cylindrical bore in which a cylindrical cartridge valve assembly is to be inserted, it is apparent that the installation of the valve assembly into the bore will require each sealing ring to pass over each preceding sealing surface and porting hole, making the probability of cutting the seals very great and requiring much skill and consumption of time in assembly. In the particular case of evenly spaced seals and matching seal lands, the problem of assembly becomes greater as each additional seal is made. The degree of skill necessary to successfully make such an installation usually requires that the valve body or manifold be removed in its entirety from the fluid system of which it is a component to permit the installation to be made at a bench position by relatively skilled technicians. After such an installation, the valve body must then be returned to the fluid system and reinstalled therein, after which the fluid system must be checked for leaks resulting from the removal and reinstallation of the valve body. Obviously, such a sequence of events is both time-consuming and expensive.

To avoid damaging the seals, it has been proposed to increase the clearance between the valve assembly and the valve body. Since the seals must of necessity contact the valve body, this proposal is at best only a partial solution. Increased spacing also increases the likelihood of seal extrusion, particularly in high-pressure systems, and often necessitates the inclusion of seal back-up rings or other anti-extrusion devices, thereby making the assembly operation more complicated and expensive.

Another attempted solution proposes the use of a cartridge assembly having stepped outside diameters. This proposed solution also requires that the valve body have a number of matched stepped bores which makes the machining of the valve body more difficult and more expensive. Additionally, th stepped valve body bore still retains a number of sharp corners which may cut seals during assembly.

A related problem arises with respect to the coding of such valve assemblies so that only the desired assembly can be inserted into a particular valve body bore. A fluid system frequently will employ a number of valve assemblies which in exterior appearance are substantially identical but which may have differing internal porting and spool arrangements. Insertion of a valve assembly of one type into a valve body intended to receive another type of valve assembly could have drastic results, especially where, for example, the fluid system involved was employed in the control system of an aircraft or a submarine.

Coding of cartridge valves presently is attempted by differing arrangements of threads located at different points along the exterior of the valve assembly. This coding technique suffers from a number of major disadvantages: first, the number of different valve codes for a given valve assembly size is greatly limited; second, the possibility exists of damage to the threads due to attempted insertion of a valve assembly into the improper valve body; third, the provision of threads on the valve assembly and on the valve body is yet another expense and complication in the manufacture of such valves.

The sealing problem is solved according to this invention by providing in the valve body or manifold a cone-shaped chamber into which the cartridge valve assembly will be received. The exterior of the valve assembly will consist of a plurality of cylindrical portions arranged in stepped varying diameters with annular sealing means contained at each of the diameter step points. The diameter and length of each of the stepped portions is chosen so that upon insertion of the valve assembly into the valve body, each of the annular sealing means first makes contact with the interior of the cone-shaped chamber at about the same time. Because no lands or steps have been machined therein, there will be no annular ridges in the chamber that can cut the sealing means; and since these sealing means are not required to pass over each of the ports contained in the chamber, the possibility that the seals will become cut or otherwise damaged during valve assembly installation is virtually eliminated.

In another embodiment of this invention, the sealing problem is solved by providing the cone-shaped chamber with a liner. The stepped valve assembly will then be inserted into the lined chamber without the need of additional annular sealing means, sealing being effected by contact of each of the circumferential diameter step points with the liner.

The problem of valve assembly coding is solved according to the present invention by providing at least one coding tab extending radially outwardly from the periphery of the valve assembly adjacent the outer end thereof. Each such coding tab will be received in a slot contained in the valve body near the opening of the bore.

Accordingly, it is an object of this invention to provide an improved valve.

Another object of this invention is to provide a valve having improved sealing characteristics between the portions thereof.

A further object of this invention is to provide a cartridge valve in which the valve assembly may be inserted in its valve body without damaging the valve assembly sealing means.

Still another object of this invention is to provide a cartridge valve in which the clearance between the valve assembly and the valve body in installed relationship is reduced.

Yet another object of this invention is to provide a cartridge valve which may be assembled by relatively unskilled personnel.

A further object of this invention is to provide a cartridge valve in which the valve assembly may be removed or replaced without the necessity of disconnecting the valve from its associated fluid system.

A still further object of this invention is to provide a cartridge valve in which only a certain valve assembly can be physically inserted into a valve body.

Another object of this invention is to provide a cartridge valve capable of a relatively great number of coding arrangements between valve assemblies and valve bodies.

Another object of this invention is to provide a cartridge valve that is easier and less expensive to assemble and maintain.

Figure 2:
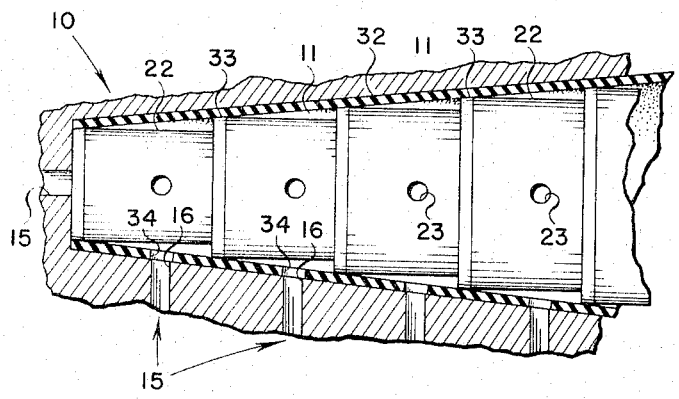
Figure 3:
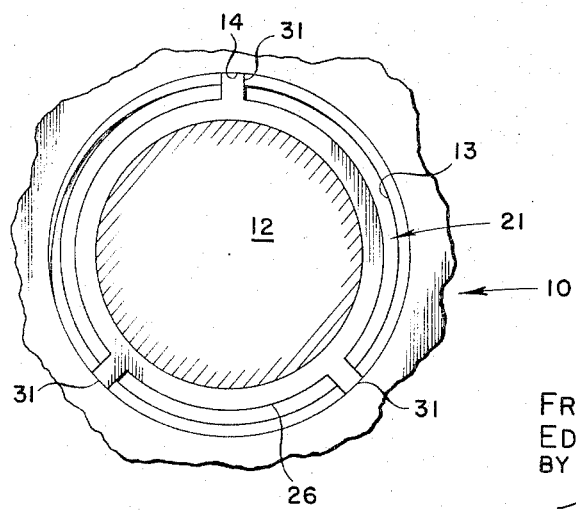

The exact nature of this invention as well as other objects and advantages thereof will be readily apparent from consideration of the following specification relating to the annexed drawing in which:

FIGURE 1 shows an embodiment of this invention;
FIGURE 2 shows another embodiment of this invention; and
FIGURE 3 is a section view taken along line 3—3 of FIGURE 1.

The invention may briefly be described as including a valve body or manifold having therein a chamber in the shape of a frustoconic section. The valve assembly to be received within the chamber is externally configured to have a number of cylindrical portions of differing diameter. These portions are arranged along the length of the valve assembly so as to provide a stepped effect ranging in sequence from the smallest to the largest diametered portion. At each point along the valve assembly where there is a step increase in diameter, there will be an elastomeric annular seal such as an O-ring. The diameters and lengths of the stepped portions are chosen such that when the valve assembly is inserted into the conical chamber, each seal will first contact the wall of the chamber only after the valve assembly is substantially completely inserted into the chamber. Anti-extrusion rings may optionally be used in conjunction with each seal depending on the fluid pressures involved. Alternatively, the chamber may be provided with a frusto-conic insert or coating and the sealing rings omitted from the valve assembly. Sealing will then be accomplished by contact of the circumferential edge formed by each step increase in diameter of the valve assembly with the frusto-conic insert or coating when the valve assembly is substantially completely inserted within the chamber.

Coding of the valve assemblies is accomplished by providing one or a plurality of coding tabs projecting radially outwardly from the periphery of the outer end of the valve assembly. These tabs may be spaced in any desired configuration and will be received in mating slots disposed in the valve body.

Turning now to FIGURE 1 of the drawing for a more detailed description of the invention, there is generally indicated at 10 a valve body or manifold having a conical chamber 11 disposed therein. While only one such chamber is shown, it should be understood that a plurality of such chambers arranged to accommodate a corresponding plurality of cartridge valve assemblies may be provided within a single unitary valve body or manifold. Chamber 11 is in the shape of a conic section having its narrowest portion at the inner end of the chamber and its widest portion at the outer end thereof. Adjacent the widest portion of chamber 11, there is contained a cylindrical opening 12 whose diameter is greater than the greatest diameter of the conical chamber 11. Conical chamber 11 and cylindrical opening 12 meet to form radial abutting surface 17. The valve body includes a plurality of port openings 15 in communication with ports 16 disposed along the surface of conical chamber 11.

Chamber 11 in valve body 10 is dimensioned to receive a cartridge valve assembly indicated generally at 21. The portion of this valve assembly to be received within conical chamber 11 includes a plurality of stepped cylindrical portions 22. As shown in the drawing, these stepped cylindrical portions vary in diameter, the smallest in diameter being at the end of the valve assembly to be disposed at the innermost end of chamber 11 and the largest of the stepped cylindrical portions being disposed at that end of the valve assembly to be contained at the outermost portion of chamber 11. Each of the stepped cylindrical portions 22 will have at least one port 23 disposed thereon. It will be seen that when the valve assembly is properly installed in the valve body, ports 23 will be operatively aligned with portions of the surface of chamber 11 containing ports 16 so that fluid pressure applied to port openings 15 will be communicated through ports 16 and 23 to the interior of the cartridge valve assembly.

Such cartridge valve assemblies typically contain an internal reciprocal spool element (not shown) which places in selective communication certain ones of ports 23. This is stated merely for purposes of illustration, however, as the internal arrangement of the cartridge valve assembly forms no part of this invention.

In the embodiment of the invention shown in FIGURE 1 there is contained on the cartridge valve asesmbly at each diameter step point thereof an annular seal 24 made of elastomeric material. Each of these seals 24, which may be by way of example take the form of the conventional O-ring, is received in an annular recess 28 defined by a pair of annular lands 25. These lands are formed on the valve assembly integrally therewith, and the peripheral edges of the lands are beveled so as to present mating surfaces to the wall of conical chamber 11. As an example of a valve made according to this invention, the chamber 11 and the surfaces mating therewith have a taper of one-sixteenth ($\frac{1}{16}$) of an inch per inch of length.

The valve assembly described above normally will not require use of the conventional anti-extrusion rings, made of a material such as Teflon or the like, in conjunction with seals 24. If seal extrusion is encountered, however, in fluid pressure systems operating at extremely high pressures, anti-extrusion rings (not shown) may be contained in recesses 28 on either or both sides of the seals 24 contained therein.

Contained on the valve assembly adjacent the largest stepped cylindrical portion thereof is annular flange 26. Flange 26 may have one or more coding tabs 31 extending radially outwardly from the periphery of the member. These tabs may be present in any number and in any angular relationship along the periphery of member 26. Valve body 10 contains one or more slots 14 corresponding in number and in angular relationship to the tabs 31 of the valve assembly that is to be inserted within conical chamber 11. It will be seen that although a number of cartridge valve assemblies 21 might be externally dimensioned so as to fit within a given conical chamber 11, proper use of coding tabs 31 and coding slots 14 will insure that only the desired valve assembly can be inserted within a certain conical chamber 11. This latter feature, as shown especially in FIGURE 3, becomes especially important where a particular valve body or manifold 10 may have therein a plurality of chambers 11 with each of the openings receiving a valve assembly having substantially similar external configuration but having dissimilar internal arrangements and functions.

In assembling the valve as described above, the operator simply inserts the narrow end of valve assembly 21 into opening 12 and thence into conical chamber 11. Of course, if the improper valve assembly has been selected, coding tabs 31 will not properly align with coding slots 14 and the operator is at once informed of the fact that he has a valve assembly not intended for this opening. As the valve assembly reaches the end of its travel into conical chamber 11, each of annular seals 24 will for the first time contact the wall of the conical opening at a point that is substantially the same as the point of contact between that annular seal and the wall at the time when the valve assembly is completely inserted within the chamber 11. This initial contact will occur at about the same time that annular stop member 26 contacts abutting surface 17. The operator will then lock the valve assembly in place by using any convenient means, such as nut 27 threadedly engaged with threaded portions 13 of the valve body 10.

At no time during the insertion of the valve assembly into the valve body does any of the annular seal members 24 come in contact with a sharp edge within the conical chamber 11. None of the seals 24 first contacts the wall of conical chamber 11 until these seals are finally positioned within chamber 11 with respect to ports 16. Because of this, the likelihood that one or more of the annular seals 24 will be damaged during insertion of the valve assembly into the valve body is virtually eliminated. Furthermore, since the valve assembly no longer has to be positioned with respect to sharp edges or other potentially damaging means within the chamber 11, the insertion operation may be performed more rapidly; and, equally importantly, it may be performed by operators who are relatively unskilled compared to the operators required to assemble the prior art cartridge valves.

In the embodiment of the invention depicted in FIGURE 2, sealing of the valve assembly within the valve body is accomplished without resort to annular sealing rings 24 and their associated anti-extrusion rings 25. To accomplish this, valve body 10 and cartridge valve assembly 21 are configured substantially as set forth in FIGURE 1, with the exception that the wall of conical chamber 11 contained in valve body 10 has disposed thereon a liner 32. This liner 32, which may take the form either of a cone-shaped insert disposed within the chamber or of a coating applied directly to the interior of the chamber or to the exterior of the valve, may be made of a metal, of an elastomeric material such as rubber, or of Teflon and will have openings 34 mated with ports 16.

The stepped cylindrical portions 22 of the valve assembly are dimensioned with respect to diameter and length so that upon insertion of the valve assembly into the conical chamber 11 the beveled peripheral edges 33 of the stepped portions 22 will first contact liner 32 when the valve assembly is substantially fully inserted within chamber 11. Sealing is provided in this embodiment by the impingement of circumferential edges 33 with liner 32. In the case of a metal liner, the liner may be omitted entirely if desired, whereby the conical chamber 11 and the stepped valve assembly must be dimensioned so that circumferential edges 33 make direct contact with the wall of conical chamber 11 when the valve assembly is substantially fully inserted therewithin.

Although the feature of coding tabs and associated coding slots has not been discussed with respect to the embodiment of FIGURE 2, it will be understood that this feature is equally applicable to the valve of that embodiment, or, indeed, to any application wherein it it desired to code devices which are to be directly inserted into an opening and which may be provided with the tab and slot arrangement disclosed herein.

In view of the foregoing description of this invention, it will be seen that there has been disclosed and explained a valve which performs the stated objects. More specifically, there has been disclosed a cartridge valve in which the annular sealing means are not cut or otherwise damaged during assembly of the valve. Because of the configuration of the valve assembly and the valve body, the clearance between these two members in their assembled form can be minimized or substantially eliminated inasmuch as the need for such clearance, viz., the protection of O-rings contained on conventional cartridge valves has been eliminated. Because of the elimination of the danger of damaging the seals, valve assembly may be accomplished in less time by relatively unskilled personnel and it may be accomplished in the field—that is, without the necessity of removing the valve from its associated fluid system. There has also been disclosed an alternative cartridge valve arrangement wherein the need for annular seals has been completely eliminated. There has also been disclosed a cartridge valve coding arrangement whereby it is impossible to insert any valve assembly other than the desired one into a given valve body.

It should be understood, of course, that the foregoing disclosure relates only to preferred embodiments of the invention and that numerous modifications or alterations may be made therein without departing from the spirit and the scope of the invention as set forth in the appended claims.

What is claimed is:

1. A fluid system comprising:
   a plurality of valve bodies and valve assemblies which respectively are substantially identical in appearances;
   a chamber in each valve body individual to each valve assembly for the operative engagement thereof whereby a number of valve sets are produced;
   a plurality of circumferential portions in spaced relation along at least some of the length of each valve assembly; and
   at least one set of coding elements including a linear slot and a complemental, interengaging tab carried by the valve body and valve assembly respectively of each said valve set establishing a predetermined relative position therebetween, the relative location and dimensions of each slot and tab of each said valve set being different from those of every other valve set and being related to the location and dimensions of the circumferential portions of its particular valve assembly to automatically dispose each of said circumferential portions in sealing engagement with the wall of its associated valve body when operatively engaged therein.

2. The fluid system of claim 1 wherein each of said circumferential portions includes an annular recess with an O-ring seated therein and projecting therefrom to effect the sealing engagement aforesaid.

3. The fluid system of claim 1 including a liner defining the chamber in each said valve body in coacting relation with each associated circumferential portion to effect the sealing engagement aforesaid.

4. The fluid system of claim 3 wherein said liner is an elastomer.

5. The fluid system of claim 1 wherein each said chamber is frusto-conical having its end of greater diameter communicating with the exterior of the valve body and its end of lesser diameter disposed within the body and each said valve assembly has a generally complementary shape, each said set of coding elements being associated with the larger ends of the valve assembly and chamber.

References Cited

UNITED STATES PATENTS

| | | | |
|---|---|---|---|
| 3,000,393 | 9/1961 | Maynard | 137—454.2 |
| 3,052,253 | 9/1962 | Priaroggia | 137—375 |
| 3,066,693 | 12/1962 | Taylor | 137—454.2 |
| 3,152,613 | 10/1964 | Shattock | 137—625.48 |
| 3,204,656 | 9/1965 | Moen | 137—454.2 |
| 3,206,530 | 9/1965 | Boteler | 137—375 |

M. CARY NELSON, *Primary Examiner.*

J. W. KNIGHT, *Assistant Examiner.*